US011214517B2

(12) United States Patent
Conrad et al.

(10) Patent No.: US 11,214,517 B2
(45) Date of Patent: Jan. 4, 2022

(54) POLYURETHANE HYBRID SYSTEM COMBINING HIGH COMPRESSIVE STRENGTH AND EARLY WATER RESISTANCE

(71) Applicant: SIKA TECHNOLOGY AG, Baar (CH)

(72) Inventors: Lars Conrad, Stuttgart (DE); Kathrin Bracht, Weil der Stadt (DE); Jochen Grötzinger, Schwäbisch Gmünd (DE)

(73) Assignee: SIKA TECHNOLOGY AG, Baar (CH)

(*) Notice: Subject to any disclaimer, the term of this patent is extended or adjusted under 35 U.S.C. 154(b) by 39 days.

(21) Appl. No.: 16/158,586

(22) Filed: Oct. 12, 2018

(65) Prior Publication Data
US 2019/0039953 A1 Feb. 7, 2019

Related U.S. Application Data

(62) Division of application No. 15/303,298, filed as application No. PCT/EP2015/057694 on Apr. 9, 2015, now abandoned.

(30) Foreign Application Priority Data

Apr. 10, 2014 (EP) .................................... 14164130

(51) Int. Cl.
| | |
|---|---|
| C04B 24/02 | (2006.01) |
| C09D 175/04 | (2006.01) |
| C04B 28/00 | (2006.01) |
| C04B 28/02 | (2006.01) |
| C04B 28/04 | (2006.01) |
| C04B 26/16 | (2006.01) |
| C08G 18/76 | (2006.01) |
| C08G 18/40 | (2006.01) |
| C04B 111/00 | (2006.01) |
| C04B 111/74 | (2006.01) |
| C04B 103/00 | (2006.01) |
| C04B 111/27 | (2006.01) |

(52) U.S. Cl.
CPC ............ *C04B 28/003* (2013.01); *C04B 24/02* (2013.01); *C04B 26/16* (2013.01); *C04B 28/02* (2013.01); *C04B 28/04* (2013.01); *C08G 18/40* (2013.01); *C08G 18/7664* (2013.01); *C09D 175/04* (2013.01); *C04B 2103/0046* (2013.01); *C04B 2111/00543* (2013.01); *C04B 2111/27* (2013.01); *C04B 2111/74* (2013.01)

(58) Field of Classification Search
CPC ....... C04B 28/003; C04B 28/02; C04B 28/04; C04B 24/02; C04B 26/16
See application file for complete search history.

(56) References Cited

U.S. PATENT DOCUMENTS

| | | | | |
|---|---|---|---|---|
| 5,476,343 A | * | 12/1995 | Sumner | .................... C04B 28/04 |
| | | | | 405/157 |
| 7,544,241 B2 | * | 6/2009 | Clarke | .................. C04B 18/248 |
| | | | | 106/644 |
| 2013/0022810 A1 | * | 1/2013 | Bower | .................... C08L 21/00 |
| | | | | 428/317.5 |
| 2017/0096368 A1 | | 4/2017 | Gimeno et al. | |

FOREIGN PATENT DOCUMENTS

| | | |
|---|---|---|
| AU | 426554 B2 | 7/1972 |
| CN | 101802112 A | 8/2010 |
| CN | 102167544 A | 8/2011 |
| EP | 0383492 A2 | 8/1990 |
| EP | 1184364 A1 | 3/2002 |
| WO | 96/06057 A1 | 2/1996 |
| WO | 97/27235 A1 | 7/1997 |

OTHER PUBLICATIONS

Jun. 12, 2019 Office Action issued in Chinese Application No. 201580019178.3.
Jul. 13, 2015 International Search Report issued in International Patent Application No. PCT/EP2015/057694.
Jul. 13, 2015 Written Opinion issued in International Patent Application No. PCT/EP2015/057694.
Kamal Henri Khayat ed; "Silica fume, fly ash, and chemical admixtures for improving performace of concretes placed under water;" Proceedings of the Canmet/ACI International Conference on the Use of Fly Ash, Silica Fume, Slag and Natural Pozzolans in Concrete; May 1992; vol. 4; pp. 59-75.
Feb. 21, 2018 Office Action issued in U.S. Appl. No. 15/303,298.
Jun. 14, 2018 Office Action Issued in U.S. Appl. No. 15/303,298.
May 29, 2018 Office Action issued in Chinese Application No. 201580019178.3.

(Continued)

*Primary Examiner* — Michael P Wieczorek
(74) *Attorney, Agent, or Firm* — Oliff PLC

(57) ABSTRACT

The invention relates to the use of a multi-component composition comprising A) a polyol component (A) comprising at least one polyol and water, B) a hardener component (B) comprising at least one polyisocyanate, and C) a solid component (C) comprising a hydraulic binder and one or more aggregates, as an early water resistant construction or repair material for constructing, repairing or refurbishing component parts, wherein the mixed and applied multi-component composition is immersed in water not later than 8 hours, preferably not later than 2 h, after application.

The use as an early water resistant construction or repair material is especially suitable for component parts, which are in contact with water during operation such as offshore wind energy plants or water retaining systems, e.g. pipelines.

17 Claims, No Drawings

(56) References Cited

OTHER PUBLICATIONS

Dec. 21, 2018 Office Action issued in Chinese Application No. 201580019178.3.
Mar. 28, 2019 Office Action issued in European Application No. 15 713 931.2.

* cited by examiner

POLYURETHANE HYBRID SYSTEM COMBINING HIGH COMPRESSIVE STRENGTH AND EARLY WATER RESISTANCE

CROSS-REFERENCE TO RELATED APPLICATIONS

This is a Division of application Ser. No. 15/303,298 filed Oct. 11, 2016, which in turn is a national stage entry of PCT/EP2015/057694 filed Apr. 9, 2015, which claims priority to European Patent Application No. 14164130.8 filed Apr. 10, 2014. The disclosure of each of the prior applications is hereby incorporated by reference herein in its entirety.

DESCRIPTION

Technical Field

The invention relates to the use of a multi-component composition, which is a polyurethane hybrid system as an early water resistant construction or repair material, and a method with the polyurethane hybrid system for construction, repair or refurbishment.

Background of the Invention

Polymer-modified cements are hybrid systems comprising an organic binder and a hydraulic binder such as cement and are known for a long time. Polymer modification of cement mortar and concrete can noticeably improve application and performance characteristics. Admixtures can improve the concrete properties, e.g. in relation to water absorption reduction, toughness enhancement, and increase of the bond strength. Though polymers are more expensive than cement, polymer admixtures are therefore used in particular applications where these properties are highly valued and where the cost performance ratio is acceptable. For instance, polymer-modified cements are often suitable for repair applications or for construction of floorings where particular properties are needed.

Products based on curable starting materials such as polyurethane cementitious hybrid systems in which the organic binder is based on polyols and an isocyanate hardener and epoxy cementitious hybrid systems in which the organic binder is based on epoxy resins and an amine hardener are known. Further polymer-modified cement systems comprise polymer latex dispersions.

While the hydraulic binder component of such hybrid systems can be cured under wet conditions, the organic binder component usually requires dry conditions for cure in order to obtain a hardened product. Thus, polymer-modified cements usually require dry conditions until the product is fully cured.

The susceptibility of polymer-modified cements to wet conditions during curing is a particular obstacle to their use for the construction, repair or refurbishment of component parts, which are in contact with water during operation, e.g. offshore applications. In general, construction and in particular repair is to be carried out on site. If the construction or repair material to be used cannot be cured underwater, specific measures such as separating means or interruption of the operation is required. For instance, repair applications of a water pipeline will require interruption of operation. It is evident that it would be highly advantageous if measures such as interruption of operation can be reduced in time as much as possible.

AU 426554 B2 relates to a process for producing non-foaming urethane prepolymers which comprises reacting polyisocyanate and polyol wherein water, metal chloride and an inorganic compound such as cement are added to the reaction system. The prepolymer can be used for coatings on surfaces such as wet surfaces.

EP 1184364 A1 describes a particular water-soluble polyurethane and applications thereof such as its use as a thickening agent for underwater concrete.

SUMMARY OF THE INVENTION

The object of the present invention is to provide construction or repair compositions which overcome the problems discussed above and which are suitable for component parts, which are in contact with water during operation. In particular, the object is to provide a construction or repair material which having a very high resistance against early water immersion and, at the same time, exhibit high mechanical resistance, e.g. compressive strength, and high chemical resistance after cure. A full through cure should be possible without blisters or any other surface failure, even at direct water contact after a short time. Moreover, it should be possible to achieve low shrinkage during curing.

Surprisingly, this object could be achieved by using a polyurethane hybrid system as construction or repair material for applications under wet conditions. It was very astonishing and against common notion that the inventors found that a polyurethane hybrid system does not fail at a direct water contact after 30 minutes or even after 15 minutes, i.e. within an early state of the curing period, but despite this early water contact a full through cure was achieved and the product obtained was free of blisters or any other surface defects and showed high mechanical resistance, e.g. compressive strength, and high chemical resistance. These results were very unexpected.

Accordingly, the present invention relates to the use of a multi-component composition comprising
A) a polyol component (A) comprising at least one polyol and water,
B) a hardener component (B) comprising at least one polyisocyanate, and
C) a solid component (C) comprising a hydraulic binder and one or more aggregates as an early water resistant construction or repair material for constructing, repairing or refurbishing component parts, wherein the mixed and applied multi-component composition is immersed in water not later than 8 hours after application.

The multi-component composition used according to the invention showed an unexpected early water resistance so that the direct water contact within a short time after application does not affect a full through cure resulting in outstanding mechanical properties, such as compressive strength, and excellent surface properties of the products obtained. Despite the water-contact within short time after application, the surface is free of defects, no pinholes, craters or blisters are observed. The product obtained exhibit high water resistance and chemical resistance. Thus, the use according to the invention is particularly suitable for component parts, which are in contact with water during operation.

DETAILED DESCRIPTION OF THE INVENTION

Compound names beginning with "poly" designate substances, which formally contain, per molecule, two or more of the functional groups occurring in their names. The compound can be a monomeric, oligomeric or polymeric compound. For instance, a polyol is a compound having two or more hydroxy groups, a polyisocyanate is a compound having two or more isocyanate groups.

The average molecular weight is understood to mean the number average molecular weight, as determined using conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane as a solvent, at 35° C.

The composition used according to the invention is a multi-component composition, i.e. the composition comprises three or more individual components. The components are stored separately in order to avoid spontaneous reaction. The components may be assembled together as a package. For use the components are combined with each other. When the components are mixed together, hydration and curing reactions begin so that the composition is to be processed within the open time after mixing the components. The multi-component composition preferably consists of three components. Optionally however, one or more additional components may be included for specific purposes. For instance, an additional component comprising coloring agents such as pigments may be used for coloring purposes.

Hybrid systems comprising organic binder components including a polyol component and a polyisocyanate hardener component suitable for cementitious applications are known to the skilled person and commercially available, for instance products of Sika Schweiz AG. An example for a commercially available combination of a binder component comprising polyol and an isocyanate hardener component are Sikafloor® PurCem products from Sika Schweiz AG.

It is clear that the proportion of a certain ingredient in the mixture of the components depends on the content of this ingredient in the respective component and the mixture ratio of the components. In the following, ratios referring to ingredients in different components relate to suitable or correct proportions of each component according to operating instructions, i.e. to the mixing ratios to be used for mixing the components and, in use to the mixture of the components prepared.

An early water resistant material refers to a material, which can be immersed in water also if the material is not yet fully cured, i.e. in an at least partially uncured state or in particular in a partially uncured state. An early water resistant material enables that at least a part of curing of the material is carried out underwater.

In the following, the components of the multi-component composition used according to the invention are explained at the first.

Polyol Component (A)

The polyol component (A) comprises one or more polyols, and water. Optionally, one or more additives may be added to component (A). Polyol component (A) is preferably a liquid component. The polyol component (A) may be viscous but is generally pourable.

Examples of suitable polyols are polyoxyalkylenepolyols, also referred to as "polyetherpolyols", polyesterpolyols, polycarbonatepolyols, poly(meth)acrylate polyols, polyhydrocarbon-polyols, polyhydroxy-functional acrylonitrile/butadiene copolymers and mixtures thereof, in particular diols thereof, and mixtures thereof.

Examples of polyetherpolyols are polyoxyethylenepolyols, polyoxypropylenepolyols and polyoxybutylenepolyols, in particular polyoxyethylenediols, polyoxypropylenediols, polyoxybutylenediols, polyoxyethylenetriols and polyoxypropylenetriols. Polyoxyalkylenediols or polyoxyalkylenetriols having a degree of unsaturation of less than 0.02 meq/g and having an average molecular weight in the range from 1000 to 30000 g/mol and polyoxyethylenediols, polyoxyethylenetriols, polyoxypropylenediols and polyoxypropylenetriols having an average molecular weight of from 400 to 8000 g/mol are suitable.

Further examples of polyetherpolyols are so-called ethylene oxide-terminated ("EO-endcapped", ethylene oxide-end-capped) polyoxypropylenepolyols, styrene-acrylonitrile-grafted polyetherpolyols, e.g. Lupranol® from BASF Polyurethanes GmbH, Germany.

Particularly preferred polyols to be used in the present invention are poly-hydroxy-functional fats and oils, for example natural fats and oils, such as castor oil, or polyols obtained by chemical modification of natural fats and oils, so-called oleochemical polyols. Castor oil is particularly preferred.

Examples of chemically modified natural fats and oils are polyols obtained from epoxypolyesters or epoxypolyethers obtained, for example, by epoxidation of unsaturated oils, by subsequent ring opening with carboxylic acids or alcohols, polyols obtained by hydroformylation and hydrogenation of unsaturated oils, or polyols which are obtained from natural fats and oils by degradation processes, such as alcoholysis or ozonolysis, and subsequent chemical linkage, for example by trans esterification or dimerization, of the degradation products thus obtained or derivatives thereof. Suitable degradation products of natural fats and oils are in particular fatty acids and fatty alcohols and fatty acid esters, in particular the methyl esters (FAME), which can be derivatized, for example, by hydroformylation and hydrogenation to give hydroxy-fatty acid esters.

The polyols mentioned above usually have a relatively high molecular weight, for instance, an average molecular weight of from 250 to 30000 g/mol, in particular from 1000 to 30000 g/mol, and/or an average OH functionality in the range from 1.6 to 3.

Further examples of suitable polyols are low molecular weight di- or polyhydric alcohols, e.g., with a molecular weight of less than 250 g/mol. Examples thereof are 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures thereof.

While said low molecular weight di- or polyhydric alcohols may be used as the polyol, the use of the polyols mentioned above having a high molecular weight is preferred. In a preferred embodiment at least one high molecular weight polyol and at least one low molecular weight di- or polyhydric alcohol are used in combination. As mentioned, a low molecular weight polyol is considered to have a molecular weight of less than 250 g/mol, whereas a high molecular weight polyol is considered to have an average molecular weight of 250 g/mol or more.

In a preferred embodiment binder component (A) comprises at least one low molecular weight polyol, preferably in combination with at least one high molecular weight polyol, in particular castor oil.

Particularly preferred is a combination of one or more polyhydroxy-functional fats and oils, such natural fats and oils, or polyols obtained by chemical modification of natural fats and oils, in particular castor oil, and one, two or more low molecular weight di- or polyhydric alcohols. In such combinations, the one or more polyols having a high molecular weight are usually used in higher amounts than the at least one low molecular weight di- or polyhydric alcohol.

Apart from the at least one polyol and water, the polyol component (A) may contain further additives. Such additives are commonly used, if desired, and typically known to the persons skilled in the art. Examples of optional further additives are plasticizers, pigments, adhesion promoters, such as silanes, e.g. epoxysilanes, (meth)acrylatosilanes and alkylsilanes, stabilizers against heat light and UV radiation, thixotropic agents, flow improving additives, flame retardants, surface active agents such as defoamers, wetting agents, flow control agents, deaerating agents, biocides and emulsifiers.

Preferably used optional additives for component (A) are one or more of plasticizers, such as benzoates, benzyl phthalates, e.g. Santicizer® 160, and diisopropylbenzene, e.g. Benzoflex®9-88; pigments, such as inorganic and organic pigments, e.g. Bayferrox® and Heucosin®; defoamers, such as solvent free and silicon free defoamers, e.g. solvent free and silicon free polymer-based defoamers, and polyorganosiloxanes, e.g. Tego® Airex and Efka®; and emulsifiers such as calcium hydroxide.

Hardener Component (B)

The hardener component (B) comprises one or more polyisocyanates. Hardener component (B) is preferably a liquid component. The hardener component (B) may be viscous but is generally pourable.

Such polyisocyanates are commercially available and widely used as hardener for polyols. Examples for suitable polyisocyanates are hexamethylene diisocyanate (HDI), HDI trimers such as Desmodur®N 3600, toluene diisocyanate (TDI), isophorone diisocyanate (IPDI) such as Vestamat®T 1890, methylene diphenyl diisocyanate and derivatives of these polyisocyanates, wherein HDI and its derivatives, and methylene diphenyl diisocyanate and its derivatives are preferred.

Monomeric and polymeric methylene diphenyl diisocyanate is most preferred. In the following, methylene diphenyl diisocyanate is abbreviated as MDI as usual. MDI is a useful compound, e.g. as a starting material for polyurethane production, and produced worldwide in millions of tons annually. A plurality of different product grades of MDI is available. "Methylene diphenyl diisocyanate" as this term is used in the present invention, include, depending on its grade, monomeric and polymeric methylene diphenyl diisocyanate.

MDI is available in the form of three different isomers, namely 4,4'-methylene diphenyl diisocyanate (4,4'-MDI), 2,4'-methylene diphenyl diisocyanate (2,4'-MDI), and 2,2'-methylene diphenyl diisocyanate (2,2'-MDI). Commercially available MDI can be classified into monomeric MDI (also designated MMDI) and polymeric MDI (PMDI) referred to as technical MDI. Polymeric MDI is the raw product of MDI synthesis containing MDI isomers and oligomeric species. Monomeric MDI is obtained from polymeric MDI by purification.

Monomeric MDI refers to "pure" MDI including products of a single MDI isomer or of isomer mixtures of two or three MDI isomers. The isomeric ratio can vary in wide ranges. For instance, 4,4'-MDI is a colorless to yellowish solid having a melting point of 39.5° C. Commercial monomeric MDI is often a mixture of 4,4'-MDI, 2,4'-MDI and typically very low levels of 2,2'-MDI.

Polymeric MDI includes oligomeric species. Usually MDI isomers are also included in polymeric MDI. Thus, polymeric MDI may contain a single MDI isomer or isomer mixtures of two or three MDI isomers, the balance being oligomeric species. Polymeric MDI tends to have isocyanate functionalities of higher than 2. The isomeric ratio as well as the amount of oligomeric species can vary in wide ranges in these products. For instance, polymeric MDI may typically contain about 30 to 80 wt. % of MDI isomers, the balance being said oligomeric species. As in the case of monomeric MDI, the MDI isomers are often a mixture of 4,4'-MDI, 2,4'-MDI and very low levels of 2,2'-MDI. Polymeric MDI is typically a brown or dark amber liquid at room temperature (23° C.).

The oligomeric species are oligomers usually having a NCO functionality of 3 or higher. The oligomeric species are a result of the synthesis process and can be represented by the following formula

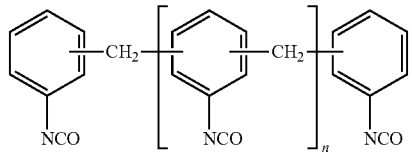

wherein n is 1 to 4 and higher. The amount of the homologues decreases with increasing chain length. The total content of homologues with n higher than 4 is generally not very high.

A wide variety of polymeric MDI grades is available with varying characteristics as to the number, type and content of isomers and oligomeric species, isomeric ratio, and weight distribution of the oligomeric homologues. These characteristics depend on type and conditions of synthesis and purification procedures. Moreover, the characteristics can be adjusted, e.g., by mixing different MDI grades according to the needs of the customer.

The hardener component (B) comprising at least one polyisocyanate may optionally comprise one or more further additives, e.g. solvents, in relatively small amounts, e.g. up to 20 or up to 10 wt. % of the additives all together, preferably up to 5 wt. % and more preferably up to 2 wt. % based on the total weight of the hardener component (B). Suitable solvents include but are not limited to esters, ketones, hydrocarbons and chlorinated hydrocarbons. If MDI is used, it is generally preferred however, that the hardener component (B) comprising an isocyanate hardener essentially consists of MDI, i.e. monomeric MDI and/or polymeric MDI, e.g. with an amount of other additives of less than 2 wt. %. Since the MDI products are technical products, they may, of course, include low quantities of impurities.

Solid Component (C)

Component (C) is a solid component comprising a hydraulic binder and one or more aggregates. Component (C) is preferably a powder.

Hydraulic binders are widely used in construction applications. They are usually used for concretes or mortars typically also including aggregates and additives. For use, the composition comprising the hydraulic binder is mixed with water so that a reaction of the hydraulic binder and water takes place, generally called hydration. Upon hydration, the hydraulic binder is hardened to form a solid building material.

A hydraulic binder is a substantially inorganic or mineral material or blend, which hardens when mixed with water. Hydraulic binders also encompasses latent hydraulic binders or pozzolanic binders which usually requires activation, e.g. by the presence of lime, in order to show hydraulic properties. All hydraulic binders known to those skilled in the art are suitable.

Typical examples of suitable hydraulic binders are at least one of cement, e.g. Portland cement, fly ash, granulated blast furnace slag, lime, such as limestone and quicklime, rice husk, calcined paper sludge, fumed silica and pozzolana or a mixture thereof. The hydraulic binder may comprise cement and/or cement substitutes such as fly ash, granulated blast furnace slag, lime, such as limestone, hydrated lime and quicklime, rice husk, calcined paper sludge, fumed silica and pozzolana. Hydraulic binders such as cement often include in addition calcium sulfate, such as gypsum, anhydrite and hemihydrate.

The hydraulic binder preferably comprises calcined paper sludge, a Portland cement or a mixture of Portland cement with at least one of supplementary cementing materials such as fly ash, granulated blast furnace slag, lime, such as limestone, hydrated lime and quicklime, rice husk, calcined paper sludge, fumed silica and pozzolana.

In a preferred embodiment, the hydraulic binder comprises calcined paper sludge, a Portland cement or a mixture of Portland cement and calcined paper sludge. In such embodiments, the hydraulic binder may also include lime, in particular hydrated lime ($Ca(OH)_2$) and/or quicklime (CaO), in particular when calcined paper sludge is contained in the hydraulic binder.

By partial or complete substitution of cement, in particular Portland cement, with one or more supplementary cementing materials as outlined above, in particular calcined paper sludge, the shrinkage of the composition during curing can be reduced drastically. There is also less dust formation during addition of component (C) when a supplementary cementing material, in particular calcined paper sludge, is included in the hydraulic binder.

Paper sludge is a well-known waste product of paper production and in particular a waste product formed during deinking of recycled paper. The latter paper sludge is also called deinked sludge or deinked paper sludge. Paper sludge originating from the deinking process of recycled paper is preferred.

The paper sludge is usually dried before it is calcined. The dried paper sludge is calcined to form calcined paper sludge. Calcination is a known process where the product is subjected to heat treatment. The calcination conditions may vary to a large extent depending on the composition of the paper sludge, the desired characteristics of the product and the duration of the heat treatment. By calcining the paper sludge the organic content is at least partially removed and the latent pozzolanic properties of the mineral content are activated. The calcined paper sludge is preferably carbon-free.

The calcined paper sludge may be prepared by subjecting the substantially dried paper sludge to temperatures e.g. in the range of from 350 to 900° C., preferably from 500 to 850° C. and more preferably from 650 to 800° C. The heat treatment may last e.g. from 1 to 8 h, preferably 2 to 5 h. The heat treatment may be effected e.g. in a simple furnace or a fluidized bed combustion system.

Particularly preferred calcined paper sludge is obtained from the process described in WO 96/06057 by CDEM Minerals BV, Netherlands, where paper sludge is calcined at a temperature in the range of 720 to 850° C. A fluidized bed system is used for heat treatment.

Calcined paper sludge is commercially available, for instance from CDEM Minerals BV, Netherlands, under the trade name TopCrete®. TopCrete® is a zero carbon material.

Calcined paper sludge is usually present in form of a powder. The color typically ranges from white to beige.

The precise composition of calcined paper sludge strongly depends on the chemistry of the paper residue inputs and the thermal conditions applied. Usually, the main ingredients of calcined paper sludge are calcium compounds such as CaO, $Ca(OH)_2$ and $CaCO_3$, and kaolinite or preferably metakaolinite. The calcined paper sludge may e.g. comprise, expressed as % oxides, $SiO_2$ (e.g. 10-40 wt. %, preferably 15-35 wt. %), CaO (e.g. 20-90 wt. %, preferably 25-60 wt. % or 30-45 wt. %), $Al_2O_3$ (e.g. 5-30 wt. %, preferably 13-20 wt. %), MgO (e.g. 1-7 wt. %, preferably 2-4 wt. %), and other metal oxides (e.g. each less than 1 wt. %). The calcined paper sludge may also contain volatile material, for instance in the form of $Ca(OH)_2$ or $CaCO_3$ or organic material the content of which strongly depends on raw material used and the heat treatment conditions applied.

Solid component (C) further comprises one or more aggregates. Aggregates are chemically inert, solid particulate materials. Aggregates come in various shapes, sizes, and materials ranging from fine particles of sand to large, coarse rocks. Examples of suitable aggregates are sand, such as silica sand, gravel, and crushed stone, slag, calcined flint, lightweight aggregates such as clay, pumice, perlite, and vermiculite. Sand, in particular silica sand, is preferably used to reach the workability expected and to obtain a smooth surface.

The grain size of the aggregates may vary depending on the application, but is preferably rather small, e.g. not more than 6 mm, preferably not more than 4 mm. The aggregate may have, for instance, a grain size in the range of 0.05 to 4 mm, wherein sand, in particular silica sand, having a grain size in the range of 0.1 to 2 mm is particularly preferred. For instance, sand having a grain size ranging from 0.3 to 0.8 mm or from 0.1 to 0.5 mm can be advantageously used in the present invention. For applications such as covering or a heavy-duty screed for trowelled finish, aggregates such as sand having a size of e.g. 3 mm to 4 mm are suitable. The grain size range can be determined, e.g. by sieve analysis.

Solid component (C) may optionally comprise one or more additives, which are commonly used, if desired, and typically known to the persons skilled in the art of cementitious applications. Examples of suitable additives, which may be optionally used in component (C), are superplasticizer such as polycarboxylate ether (PCE); oil such as mineral oil, paraffin oil and organic oil, cellulose fibers, and inorganic or organic pigments. A further additive, which may be contained in solid component (C), is lime such as hydrated lime, and burnt lime.

Suitable Proportions for the Multi-Component Composition

The multi-component composition of the invention is preferably formulated such that the content of the one or more polyisocyanates is in the range of 10 to 25% by weight, preferably 10 to 20% by weight, more preferably 15 to 20% by weight, based on the total weight of component (A), component (B) and component (C).

The multi-component composition is preferably formulated such that the content of the hydraulic binder is in the range of 10 to 30% by weight, preferably in the range of 15 to 25% by weight, based on the total weight of component (A), component (B) and component (C). This preferred content of the hydraulic binder also includes the weight of calcium hydroxide and/or calcium oxide, if present. If present, the content of calcium hydroxide and/or calcium oxide, considered alone, may be, e.g., in the range of 1 to 5% by weight, based on the total weight of component (A), component (B) and component (C).

The multi-component composition is preferably free of metal chloride. Free of metal chloride means that the content of metal chloride is less than 0.05% by weight, preferably less than 0.02% by weight based on the total weight of polyols and polyisocyanates in the multi-component composition.

Further, the multi-component composition is preferably formulated such that the weight ratio of water to hydraulic binder is in the range of 0.15 to 0.35, preferably in the range of 0.2 to 0.3. The molar ratio of NCO groups to alcoholic OH groups in the multi-component composition is preferably in the range of from 3 to 5 and more preferably in the range of from 3.5 to 4.5. Said molar ratio further improves compressive strength of the finished product. The molar ratio can easily be determined via the equivalent weights of the polyols and polyisocyanates used.

Component (A) is preferably formulated such that the water content is in the range of 10 to 40% by weight, preferably 20 to 30% by weight, and/or the content of one or more polyols, preferably including castor oil, is 35 to 55, preferably 38 to 45% by weight, based on the total content of component (A). In a preferred embodiment at least one high molecular weight polyol, preferably castor oil, and at least on low molecular polyol are contained in component (A). In this case, the content of high molecular weight polyol such as castor oil is e.g. in the range of 33 to 45% by weight, and the content of low molecular weight polyol is e.g. in the range of 2 to 10% by weight, based on the total content of component (A).

Component (C) is for instance formulated such that the content of the hydraulic binder, including calcium hydroxide and/or calcium oxide, if present, is in the range of 10 to 40% by weight, preferably 20 to 35% by weight, based on the total weight of component (C), wherein it is preferred that the hydraulic binder comprises cement, in particular Portland cement, calcined paper sludge or a mixture thereof. The content of one or more aggregates is e.g. in the range of 60 to 90 wt. %, preferably in the range of 65 to 80 wt. %, based on the total weight of solid component (C). Component (C) may also comprise one or more additives as mentioned above.

As mentioned, in the use according to the present invention, the hydraulic binder of component (C) preferably comprises cement, in particular Portland cement, calcined paper sludge or a mixture of calcined paper sludge and cement, in particular Portland cement. If calcined paper sludge is present, the solid component (C) may e.g. comprise from 10 to 100 wt. %, preferably from 50 to 100 wt. %, more preferably from 80 to 100 wt. %, in particular about 100 wt. % calcined paper sludge, based on the total weight of cement, in particular Portland cement, if present, and calcined paper sludge in component (C).

Use of the Multi-Component Composition

When the components of the multi-component composition are mixed, the hydraulic binder reacts with water. This reaction is generally called hydration. Upon the reaction with the water, the hydraulic binder is cured to a solid material. Moreover, the one or more polyols of component (A) and the one or more polyisocyanates of hardener component (B) react upon mixture so that the organic binder is also cured. Thus, upon curing a hybrid solid material comprising an inorganic binder portion and an organic binder portion in which the aggregates are bound is formed.

The reaction of the one or more polyols and of the one or more polyisocyanates results in cured organic binder which is a polyurethane. Thus, the hybrid solid material after curing comprises an inorganic network and an polyurethane network which form the matrix of the hybrid solid material. Accordingly, the polyurethane or polyurethane network, respectively, formed is not soluble in water.

The multi-component composition as defined above is used as an early water resistant construction or repair material for constructing, repairing or refurbishing component parts, wherein the mixed and applied multi-component composition is immersed in water not later than 8 hours after application.

For use, the polyol component (A) and the hardener component (B) are usually mixed with each other, and then solid component (C) is added to this mixture. Then the mixture is applied as the construction or repair material on a desired location and in a desired shape to construct, repair or refurbish the component part.

The mixed and applied multi-component composition is immersed in water not later than 8 hours, preferably not later than 4 hours and more preferably not later than 2 hours after application. The inventors have unexpectedly found that the mixed and applied multi-component composition can be even immersed in water 30 minutes or even 15 minutes after application.

A wet surface or material is not a surface or material which is immersed in water. In particular, a surface or material immersed in water is underwater.

Even when the mixed and applied multi-component composition is in direct contact with water after this short time, a full through cure is achieved and the mechanical and surface properties as well as water resistance and chemical resistance of the cured multi-component composition are essentially not affected by the early water contact. Thus, the multi-component composition can be used as an early water resistant construction or repair material. It is, however, preferred that the mixed and applied construction or repair material is immersed in water not earlier than 10 minutes after application.

Accordingly, it is preferred that after application a part of curing of the multi-component composition is carried out when the multi-component composition is not immersed in water. At least part of curing, preferably a part of curing, of the multi-component composition is usually carried out when the composition is immersed in water or underwater, respectively. Hence, in the preferred embodiment, the applied multi-component composition is partially cured when the multi-component composition is not immersed in water, and the not fully cured multi-component composition is immersed in water where curing is completed.

The curing time of the multi-component composition may e.g. range from 15 hours to 72 hours depending on the temperature during hardening. Thus, according to the use of the invention, the mixed and applied multi-component composition is usually not fully cured when it is immersed in water. Actually, it is possible to submerge the mixed and applied multi-component composition in water when its curing degree is rather low.

The application temperature is e.g. from about 8 to 40° C., preferably from about to 30° C.

The water in which the mixed and applied multi-component composition is immersed may be pure water or water comprising one or more further ingredients, which may be dissolved and/or dispersed in the water. Typical examples of the water for immersion are potable water, seawater, ground water, fresh water, sewage or wastewater.

As already mentioned, the polyol component (A) preferably comprises a castor oil, in particular a castor oil emulsion, as polyol. The hardener component (B) preferably comprises a methylene diphenyl diisocyanate, in particular a polymeric methylene diphenyl diisocyanate, as polyisocyanate. If the polyol component (A) comprises castor oil or if the hardener component (B) comprises a methylene diphenyl diisocyanate, in particular a polymeric methylene diphenyl diisocyanate, the early water resistance of the multi-component composition is improved.

As already mentioned, the hydraulic binder preferably comprises cement, calcined paper sludge or cement and calcined paper sludge. For this embodiment, it is also preferred that polyol component (A) comprises a castor oil, in particular a castor oil emulsion, and/or the hardener component (B) comprises a methylene diphenyl diisocyanate, in particular a polymeric methylene diphenyl diisocyanate.

The multi-component composition used as construction or repair material is preferably a flooring material, a coating composition, a grout or a putty.

As mentioned, the multi-component composition can be used for construction, repair or refurbishment of component parts. It is preferably used for repair or refurbishment of component parts.

It is preferred that the component part to be constructed, repaired or refurbished is a component part which is in contact with water during operation.

Suitable applications in general for the use according to the invention are for instance offshore applications, pipeline repair or lining applications, for instance linings of pipes and fittings and the repair or refurbishment thereof.

The component part to be repaired or refurbished and the substrate on which the component part is to be constructed, e.g. as a coating, flooring or lining, may be of any material, for instance concrete, mortar, metal, such as steel or copper, stones, bricks, masonry, coatings, composite material or plastic.

The component part to be constructed, repaired or refurbished may, for instance, be a part of a wind energy plant, in particular an offshore wind energy plant, a water treatment plant, a dam, a sea wall or a water retaining system such as a water pipeline, a sewer or a pool, or a foundation such as a foundation of bridges, drilling rigs or other buildings.

The multi-component composition may be used e.g. for refurbishment, grouting, lock assembly or tightening of bushings or joints.

Method for Construction, Repair or Refurbishment

The invention also encompasses a method for construction, repair or refurbishment. The method for the construction, reparation or refurbishment of component parts by means of the multi-component composition as defined above comprises the steps of a) providing a space where the component part is to be constructed, repaired or refurbished so that the space is not in contact with water, b) mixing components (A), (B) and (C) of the multi-component composition to provide a construction or repair material, c) applying the construction or repair material on a desired location and in a desired shape within the space provided and initial curing of the construction or repair material to construct, repair or refurbish the component part, and d) bringing the component part in contact with water so that the applied construction or repair material is immersed in water not later than 8 hours after application.

All above explanations with respect to the multi-component composition and its use for constructing, repairing or refurbishing of component parts, of course, equally apply for the method. In particular, the applied construction or repair material is immersed in water not later than 8 hours, preferably not later than 4 hours and more preferably not later than 2 hours after application. It is however preferred that the applied construction or repair material is immersed in water not earlier than 10 minutes after application. A contact with water means in particular immersion in water or underwater, respectively.

The application of the construction material or repair material can be effected by any conventional application method. The application of the construction material or repair material is preferably by coating, flooring, grouting or puttying.

The invention is further explained in the following experimental part, which, however shall not be construed as limiting the scope of the invention. The proportions and percentage indicated are by weight, unless otherwise stated.

EXAMPLES

Example

Sikafloor®-21 N PurCem from Sika Schweiz AG was used to produce a flooring. Sikafloor®-21 N PurCem is a three part, water dispersed medium to high strength colored polyurethane modified, cement and aggregate screed with self-smoothing properties. Part A is a colored liquid, which is a waterborne polyol, part B is a brown liquid, which is mainly methylene diphenyl diisocyanate, and part C is a natural grey powder comprising Portland cement, aggregate and fillers. The parts are mixed in a weight ratio of part A/part B/part C of 3.0/3.0/15.0.

For mixing, part A is manually stirred for a short time, then part A and part B are mixed with a low speed mixer for about 1 min. The mixture of A and B is provided in a forced action mixer and stirred with a stirring speed of about 300 to 400 rpm while part C is added to obtain a homogeneous mixture within about 3 min of stirring.

The application is carried out at a temperature of 23° C. The mixture obtained is poured on a concrete substrate and spread with a trowel to obtain a floor with a thickness of about 5 mm. The applied flooring is immersed into water 30 minutes after application and curing is continued underwater for a total of 24 hours.

Comparative Example

As a comparison a flooring is produced in the same way as in the Example but the applied flooring is not immersed in water after 30 min but cured at a temperature of 23° C. and 50% r.H. for 24 hours after which the product is fully cured.

Result

After 24 hours the product of the Example immersed in water after 30 minutes is fully cured and the surface aspect is very close to that of the product of the Comparative example not in contact to water during curing.

The invention claimed is:

1. A method for constructing, repairing, or refurbishing at least one component part, the method comprising:
   i) providing a multi-component composition consisting of:
      A) a polyol component (A) comprising at least one polyol, water, and optionally at least one first additive that is selected from the group consisting of a plasticizer, a pigment, an adhesion promoter, a stabilizer against heat light and UV radiation, a thixotropic agent, a flow improving additive, a flame retardant, a defoamer, a wetting agent, a flow control agent, a deaerating agent, a biocide, and an emulsifier,
      B) a hardener component (B) comprising at least one polyisocyanate, and optionally a solvent, and
      C) a solid component (C) comprising a hydraulic binder, one or more aggregates that is selected from the group consisting of sand, slag, calcined flint, clay, pumice, perlite, and vermiculite, and optionally at least one second additive that is selected from the group consisting of a superplasticizer, an oil, cellulose fibers, a pigment, and lime,
      wherein:
      the polyol component (A), the hardener component (B), and the solid component (C) are separately provided, and
      a content of the at least one polyisocyanate is in a range of 10 to 25% by weight, based on a total weight of the polyol component (A), the hardener component (B), and the solid component (C),
   ii) mixing components (A), (B), and (C) of the multi-component composition to form a mixture,
   iii) applying the mixture either on the component part to repair or refurbish the component part or in a space that is not in contact with water to form the component part, and
   iv) immersing the applied mixture not earlier than 10 minutes and not later than 8 hours after the mixture is applied.

2. The method according to claim 1, further comprising curing the applied mixture after the mixture is applied.

3. The method according to claim 2, wherein at least part of the curing of the applied mixture is carried out underwater.

4. The method according to claim 1, wherein the applied mixture is immersed in water not later than 4 hours after the mixture is applied.

5. The method according to claim 1, wherein the applied mixture is immersed in water not later than 2 hours after the mixture is applied.

6. The method according to claim 1, wherein the application of the mixture on the component part occurs when the component part is not in contact with water.

7. The method according to claim 1, wherein the polyol component (A) comprises castor oil.

8. The method according to claim 7, wherein in the polyol component (A):
   an amount of the at least one polyol is in a range of from 35 to 55% by weight, based on a total content of component (A), and
   an amount of the castor oil is in a range of from 33 to 45% by weight, based on the total content of component (A).

9. The method according to claim 1, wherein the hardener component (B) comprises a methylene diphenyl diisocyanate.

10. The method according to claim 9, wherein the polyol component (A) comprises castor oil.

11. The method according to claim 1, wherein the hydraulic binder comprises cement or calcined paper sludge.

12. The method according to claim 1, wherein the applying includes coating, flooring, grouting, or puttying the mixture.

13. The method according to claim 1, wherein the mixture is a flooring material, a coating composition, a grout, or a putty.

14. The method according to claim 1, wherein the component part is configured for offshore applications, pipeline repair, or lining applications.

15. The method according to claim 1, wherein the component part is part of a wind energy plant, a water treatment plant, a dam, a sea wall, or a water retaining system.

16. The method according to claim 1, wherein the component part is configured to be in contact with water in applications that require the component part to contact water.

17. The method according to claim 1, wherein the method is configured for refurbishment, grouting, lock assembly, or tightening of bushings or joints.

* * * * *